Sept. 22, 1970          G. B. DOUGLAS          3,529,644
LEMON PEELER
Filed March 25, 1968
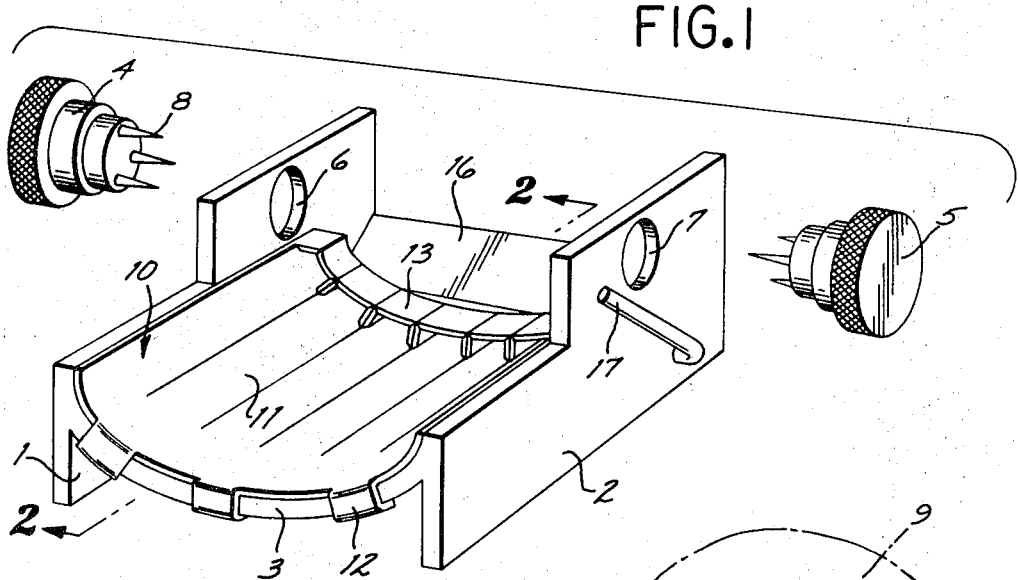
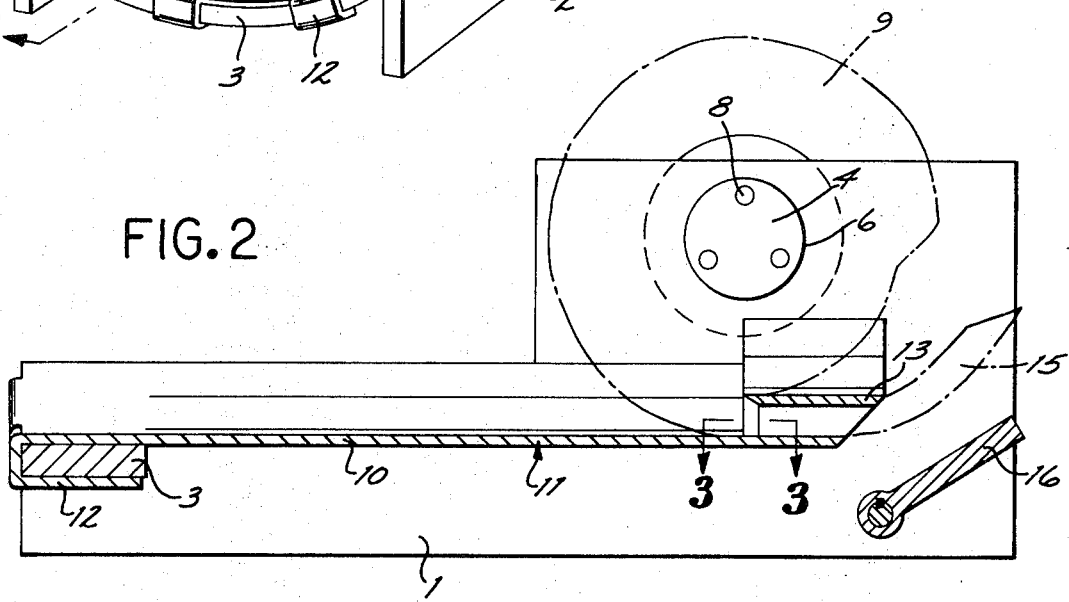
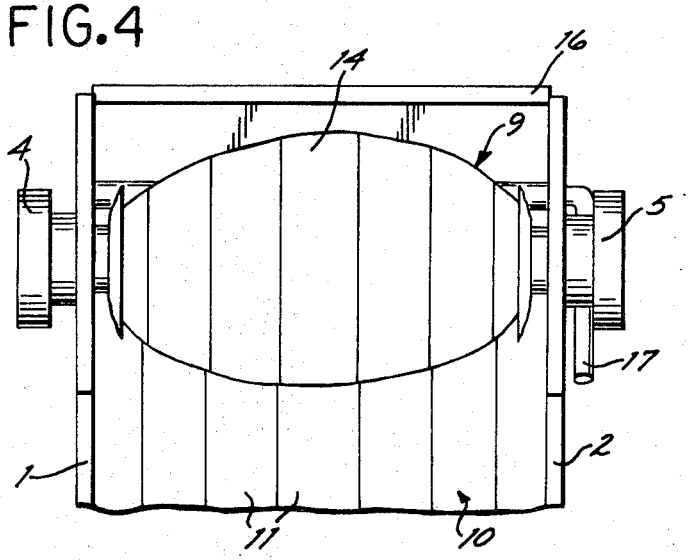
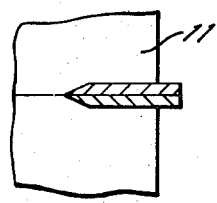
INVENTOR.
GEORGE B. DOUGLAS
BY
ATTORNEY

United States Patent Office 3,529,644
Patented Sept. 22, 1970

3,529,644
LEMON PEELER
George B. Douglas, 550 40th St.,
San Pedro, Calif. 90731
Filed Mar. 25, 1968, Ser. No. 715,878
Int. Cl. A47j *17/04, 43/28*
U.S. Cl. 146—3                                       4 Claims

ABSTRACT OF THE DISCLOSURE

A novel lemon peeler in which the lemon can be easily mounted adjacent to a cutter, and the lemon can then be manually rotated for the purpose of cutting lemon peel strips from the lemon.

---

In order to peel a lemon circumferentially for the purpose of using the lemon peel in mixed alcoholic drinks, the lemon peel must be cut only to the top surface of the lemon meat and not more, or less, so that the strips of lemon peel can be easily twisted and dropped into the drink.

Another object of my invention is to provide a novel lemon peeler of the character stated in which the various parts can be easily disassembled and washed.

Another object of my invention is to provide a novel lemon peeler in which the cutter blades are held against the face of the lemon in the peeler by the spring tension of the cutter structure itself.

Still another object is to provide a novel lemon peeler which will quickly and easily cut strips from the rind of the lemon in a manner which will enable the strips to be used in a mixed alcoholic drink.

Other objects, advantages and features of invention may appear from the accompanying drawing, the subjoined detailed description and the appended claims.

In the drawing:

FIG. 1 is a perspective disassembled view of my lemon peeler.

FIG. 2 is a longitudinal sectional view taken on line 2—2 of FIG. 1.

FIG. 3 is a sectional view taken on line 3—3 of FIG. 2.

FIG. 4 is a fragmentary plan view of the rear portion of my lemon peeler.

Referring more particularly to the drawing, my lemon peeler includes a pair of vertical walls 1 and 2. These vertical walls are connected by a rib 3 which extends between them and holds the frame of the peeler together. A pair of thimbles 4 and 5 are rotatably mounted in the holes 6 and 7 respectively in the walls 1 and 2. The thimbles 4 and 5 are each provided with prongs 8 which extend into each end of the lemon 9 to hold the lemon between the walls 1 and 2 and in a position to have strips of the rind cut therefrom, as will be subsequently described. As shown in FIG. 4 the lemon 9 is held axially between the thimbles 4 and 5 and will be rotated on its lengthwise axis when either or both of the thimbles 4 and 5 are manually rotated.

A cutter plate 10 is formed of spring metal and is arcuate in a transverse direction so as to conform roughly to the lengthwise axis of the lemon 9. A plurality of spring fingers 11 are formed in the cutter plate 10 and, consequently, these cutters will spring up or down, depending on the contour of the lemon. The cutter plate 10 is held in position between the side plates 1 and 2 by means of a plurality of hooks 12 which fit over the bar 3, and will removably hold the cutter plate in position but will permit the cutter plate to be readily removed if it is necessary to wash the same. Each of the spring fingers 11 are formed at their inner ends with a hollow cutter 13, the front edges of each of which are sharp so as to cut into the rind a proper distance and still not cut into the flesh of the lemon. The strips of lemon 14 will pass through the hollow cutter 13, as shown at 15, and are then collected for subsequent use. In order to cut the strips 15 of the lemon rind into shorter lengths than the entire periphery of the lemon, I provide a cutter plate 16 which is journaled in the walls 1–2 and is rotated or pressed against the face of the lemon by the handle 17. Thus the strip of lemon rind can be cut in any lengths required.

Having described my invention, I claim:

1. A lemon peeler comprising a frame including a pair of spaced walls, a thimble rotatably mounted in each wall, lemon engaging means on each thimble, cutter means positioned between said walls, said cutter means being adapted and arranged to cut the lemon rind into strips, and said cutter means including a plurality of spring fingers, and a lemon rind cutter at one end of each of said spring fingers.

2. A lemon peeler as recited in claim 1, and means detachably mounting the cutter means on the frame, said cutter means including a plurality of spring fingers, and a lemon rind cutter at one end of each of said spring fingers.

3. A lemon peeler as recited in claim 1, and a cutter plate pivotally mounted on the frame adjacent the cutter means to engage and press the lemon peel against said cutter means.

4. A lemon peeler as recited in claim 1, and a cutter plate pivotally mounted on the frame adjacent the cutter means to engage and press the lemon peel against said cutter means, said cutter means including a plurality of spring fingers, and a lemon rind cutter at one end of each of said spring fingers.

References Cited

UNITED STATES PATENTS 1,277,148    8/1918    Starr _____ 146—3 X

W. GRAYDON ABERCROMBIE, Primary Examiner

U.S. Cl. X.R.

146—166